US012755146B2

(12) United States Patent
Park et al.

(10) Patent No.: US 12,755,146 B2
(45) Date of Patent: Oct. 6, 2026

(54) CLASSIFICATION METHOD USING DISTRIBUTED CLASSIFICATION MODEL

(71) Applicant: INDUSTRY ACADEMY COOPERATION FOUNDATION OF SEJONG UNIVERSITY, Seoul (KR)

(72) Inventors: Gi-Ho Park, Seoul (KR); Jun Young Kim, Incheon (KR); Jong Ho Jeon, Bucheon-si (KR); Min Kwan Kee, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 1229 days.

(21) Appl. No.: 17/622,175

(22) PCT Filed: Jun. 23, 2020

(86) PCT No.: PCT/KR2020/008157
§ 371 (c)(1),
(2) Date: Feb. 25, 2022

(87) PCT Pub. No.: WO2020/262932
PCT Pub. Date: Dec. 30, 2020

(65) Prior Publication Data

US 2022/0335289 A1 Oct. 20, 2022

(30) Foreign Application Priority Data

Jun. 25, 2019 (KR) ........................ 10-2019-0075858
Jun. 23, 2020 (KR) ........................ 10-2020-0076297

(51) Int. Cl.
*G06N 3/045* (2023.01)
*G06N 3/0464* (2023.01)
(Continued)

(52) U.S. Cl.
CPC ............... *G06N 3/08* (2013.01); *G06N 3/045* (2023.01)

(58) Field of Classification Search
CPC ........... G06N 3/08; G06N 3/045; G06N 3/082
See application file for complete search history.

(56) References Cited

U.S. PATENT DOCUMENTS 7,383,260 B2 6/2008 Smith et al.
7,809,723 B2 * 10/2010 Liu ........................ G06N 20/10 707/736

(Continued)

FOREIGN PATENT DOCUMENTS

JP 2019-016249 A 1/2019
KR 10-2012-0121143 A 11/2012

OTHER PUBLICATIONS

"From Categories to Subcategories: Large-scale Image Classification with Partial Class Label Refinement", https://openaccess.thecvf.com/content_cvpr_2015/papers/Ristin_From_Categories_to_2015_CVPR_paper.pdf, Ristin et al., 2015) (Year: 2015).*

(Continued)

*Primary Examiner* — Kakali Chaki
*Assistant Examiner* — Jacob Z. Sussman Moss

(57) ABSTRACT

Disclosed is a method for classifying target data into a particular class by distributing a previously learned classification model to a plurality of terminals. A disclosed classification method using a distributed classification model comprises the steps of: receiving classification data which is for target data and generated by means of subclassification models respectively distributed to a plurality of terminals; and determining a final class for the target data by means of the classification data. Each class for classification allocated to the previously learned subclassification models comprises at least one of a plurality of target classes. The (Continued)

number of classes allocated to the respective subclassification models is less than the number of the target classes.

14 Claims, 7 Drawing Sheets

(51) Int. Cl.

| | |
|---|---|
| ***G06N 3/0495*** | (2023.01) |
| ***G06N 3/08*** | (2023.01) |
| ***G06N 3/082*** | (2023.01) |
| ***G06N 3/09*** | (2023.01) |

(56) References Cited

U.S. PATENT DOCUMENTS 8,892,494 B2 * 11/2014 Ono ........................ G06T 7/001
706/47
2004/0064552 A1 * 4/2004 Chong ................ G06F 11/3006
709/224
2019/0188760 A1 * 6/2019 Ekambaram ....... G06Q 30/0283

OTHER PUBLICATIONS

Machine translation of "System and Method for Diagnosing Disease Based on Distributed Process", KR20120121143A, Jung et al., 2011) (Year: 2011).*
International Search Report issued from PCT International Application No. PCT/KR2020/008157 issued on Sep. 21, 2020.
Written Opinion issued from PCT International Application No. PCT/KR2020/008157 issued on Sep. 21, 2020.

* cited by examiner

CLASSIFICATION METHOD USING DISTRIBUTED CLASSIFICATION MODEL

CROSS-REFERENCE TO RELATED APPLICATIONS

This application is a National Stage Entry of PCT International Application No. PCT/KR2020/008157, which was filed on Jun. 23, 2020, and which claims priority from and the benefit of Korean Patent Application 10-2020-0076297, filed with the Korean Intellectual Property Office on Jun. 23, 2020, and Korean Patent Application 10-2019-0075858, filed with the Korean Intellectual Property Office on Jun. 25, 2019. The disclosure of the above patent application is hereby incorporated by reference in its entirety.

TECHNICAL FIELD

The present disclosure relates to a classification method employing distributed classification models, and more particularly, to a method of distributing pretrained classification models to several terminals and classifying target data into a specific class.

BACKGROUND ART

Existing machine learning processing based on deep learning is continuously expanding its application fields, and the complexity of a model and performance required for executing the model are continuously rising to improve the accuracy of the model. Such a model is executed by a single device, which is mainly a high-performance server or a server equipped with a dedicated accelerator, or executed in a distributed manner in which data collected by end devices is gathered and processed by a server.

In general, low-performance devices, such as a smartphone and an Internet of things (IoT) terminal, transmit data collected from end devices to a server for processing due to a limitation in memory or performance thereof. Lately, network-slimming techniques involving accuracy loss, such as a pruning technique for reducing the size of a model, may have been employed. The pruning technique is a technique for reducing the number of model weights by removing connections to nodes which have a little effect on results among connections to neural network nodes to lighten a model. However, since the pruning technique directly removes weights of a model, the accuracy of the model significantly decreases with the progress of slimming.

With the development of Internet of things (IoT) technology and the like, there is an increasing necessity to provide an intelligence service based on deep learning through relatively low-power and low-performance devices such as a smartphone and an IoT terminal. Also, research is under way on distributed processing of a high-performance deep learning classification model based on many such low-performance devices. Together with slimming based on the above-described pruning technique, a method of processing the internal computation of each layer constituting a deep learning model is being researched as another method for performing deep learning in a low-performance terminal device.

DISCLOSURE

Technical Problem

The present disclosure is directed to providing a classification method employing distributed classification models which increases the accuracy of a classification result and stably acquires the classification result.

The present disclosure is also directed to providing a classification method employing distributed classification models which distributes computation for classification and increases the degree of slimming of the classification models.

Technical Solution

One aspect of the present disclosure provides a classification method employing distributed classification models, the classification method including receiving classification data for target data generated through subclassification models each distributed to a plurality of terminals and determining a final class for the target data using the classification data. Classes allocated for classification to each of the pretrained subclassification models include at least one of a plurality of target classes, and the number of classes allocated to each of the subclassification models is less than the number of target classes.

Another aspect of the present disclosure provides a classification method employing distributed classification models, the classification method including monitoring resources of a plurality of terminals and allocating subclassification models to the terminals according to a monitoring result. Classes allocated for classification to each of the subclassification models, which have been trained in advance, include at least one of a plurality of target classes, and the number of classes allocated to each of the subclassification models is less than the number of target classes.

Still another aspect of the present disclosure provides a classification method employing distributed classification models, the classification method including monitoring resources of a plurality of candidate terminals and determining classification terminals for classifying target data using subclassification models among the candidate terminals according to a monitoring result. Classes allocated for classification to each of the subclassification models, which have been trained in advance, include at least one of a plurality of target classes, and the number of classes allocated to each of the subclassification models is less than the number of target classes.

Advantageous Effects

According to an embodiment of the present disclosure, subclassification models are distributed to classify target data. Accordingly, it is possible to increase the accuracy of classification results and stably acquire the classification results.

According to an embodiment of the present disclosure, even when a failure occurs in a terminal to which some subclassification models are allocated, it is possible to perform classification using classification data of the remaining subclassification models. Accordingly, stable classification results can be acquired.

According to an embodiment of the present disclosure, it is possible to use subclassification models that satisfy required classification accuracy and are more lightened, and thus the amount of computation for classification can be reduced.

MODES OF THE INVENTION

Figure 1:
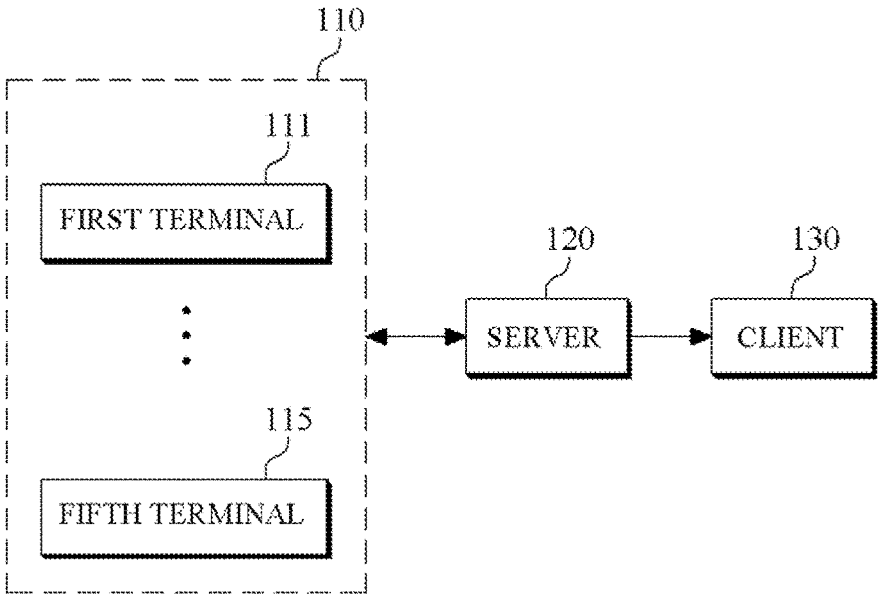
FIG. 1 is a diagram for describing a classification system according to an embodiment of the present disclosure.

The present disclosure may be modified into various forms and may have a variety of embodiments, and specific embodiments will be illustrated in the accompanying drawings and described in detail below. However, this is not intended to limit the present disclosure to a specific embodiment, and it should be understood to include all changes, equivalents, or substitutes included in the spirit and scope of the present disclosure. In describing each drawing, the same reference numerals are used for the same elements.

As a method of reducing the amount of computation of a classification model for classifying target data into a specific class, a method for processing the computation of a classification model in a distributed manner by splitting the computation, a method of reducing a weight of a classification model through a pruning technique, etc. are used.

The method for processing the computation of a classification model in a distributed manner by splitting the computation may be performed, for example, by processing the computations of layers of a classification model in different devices. Therefore, when a failure occurs in a device responsible for the computation of a specific layer or there is trouble in a network, a result of the classification model is not acquired.

Also, the method of reducing a weight of a classification model has a problem in that the accuracy of a classification result decreases.

Accordingly, the present disclosure proposes a classification method employing distributed models for stably acquiring a classification result while reducing the amount of computation of a classification model.

A classification model according to an embodiment of the present disclosure is a classification model based on machine learning and may be a pretrained artificial neural network. Also, the classification model according to the embodiment of the present disclosure classifies input data into one of a plurality of classes, and a neural network in use may vary depending on the characteristic or form of the input data. According to the embodiment, the input data may be an image, and in this case, a neural network including a convolutional layer may be used as the classification model.

The classification method according to the embodiment of the present disclosure may be performed in a computing device including a processor and a memory, and the computing device may include a terminal, a server, etc.

Hereinafter, embodiments of the present disclosure will be described in detail with reference to the accompanying drawings.

Figure 2:
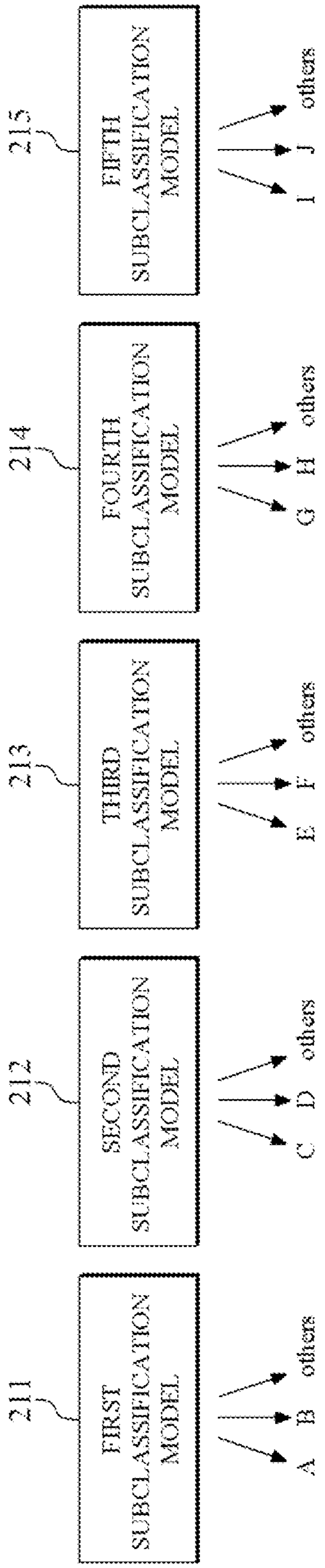
FIG. 2 is a diagram for describing subclassification models according to an embodiment of the present disclosure.

FIG. 1 is a diagram for describing a classification system according to an embodiment of the present disclosure. FIG. 2 is a diagram for describing subclassification models according to an embodiment of the present disclosure.

FIGS. 1 and 2 illustrate an embodiment in which five terminals and five subclassification models are used, but the number of terminals and subclassification models used for classification may vary in some embodiments.

Referring to FIG. 1, the classification system according to the embodiment of the present disclosure includes a plurality of terminals and a server.

A plurality of terminals 111 to 115 may be included in one local network 110 but are not limited thereto. Subclassification models are each stored in one of the terminals 111 to 115 in a distributed manner, and according to the embodiment, the subclassification models may be provided by a server 120.

The subclassification models may generate classification data for input target data, for example, a target image, and classify the target image into one of preset classes. Classification models distributed to terminals classify target images into some of a plurality of target classes and thus may be referred to as subclassification models.

According to an embodiment, classes allocated for classification to each subclassification model may include at least one of a plurality of preset target classes, and the number of classes allocated to each subclassification model may be smaller than the number of target classes. Also, in some embodiments, classes allocated to each subclassification model may include other class, which are class other than the target classes. Other class indicates a class that is not included in any target classes.

For example, when there are a total of ten target classes A to J, classes for classification may be allocated to first to fifth subclassification models 211 to 215 as shown in FIG. 2. The classes A, B, and others may be allocated to the first subclassification model 211, the classes C, D, and others may be allocated to the second subclassification model 212, classes E, F, and others may be allocated to the third subclassification model 213, classes G, H, and others may be allocated to the fourth subclassification model 214, and classes I, J, and others may be allocated to the fifth subclassification model 215.

According to an embodiment, subclassification models may be lightweight models from a main classification model, and classes allocated for classification to the main classification model may include a plurality of target classes. In other words, the main classification model may be lightened into a plurality of subclassification models through a pruning technique and the like and allocated to each of terminals.

The class of a classification model corresponds to a label of a learning process. For example, the main classification model may be a model trained with training data labeled as A to J and others.

Alternatively, according to another embodiment, subclassification models may be models that are trained independently of the main classification model. These subclassification models may also be lightened through a pruning technique and the like.

As shown in FIG. 2, classes allocated to each subclassification model may include different target classes. Classes allocated to each subclassification model may vary in some embodiments.

As described above, subclassification models are artificial neural networks, and each subclassification model may generate confidence values for classes allocated thereto as classification data for a target image. The confidence values correspond to probabilities that the target image is the corresponding classes.

Referring back to FIG. 1, subclassification models allocated to each of the terminals 111 to 115 may be determined according to results of monitoring terminal resources. Such monitoring may be performed by one of the plurality of terminals 111 to 115 or the server 120. According to an embodiment, monitored resources may be the amount of computation, the memory size, the network usage, etc. of the terminals, and subclassification models allocated to each of the terminals 111 to 115 may be determined depending on the amount of available resources of the terminals.

The subclassification models generate classification data for input target data, for example, a target image. The target image may be transmitted from one of the plurality of terminals 111 to 115 to another terminal, and the terminal transmitting the target image may also be determined according to the results of monitoring terminal resources. According to the embodiment, the target image may be provided from the server 120 to the plurality of terminals 111 to 115.

One of the plurality of terminals 111 to 115 may receive classification data generated by another terminal and determines a final class for the target image. The terminal for determining the final class may be determined according to the results of monitoring terminal resources, and in some embodiments, the server 120 may receive the classification data and determine the final class.

The determined final class is provided to the client 130.

Figure 3:
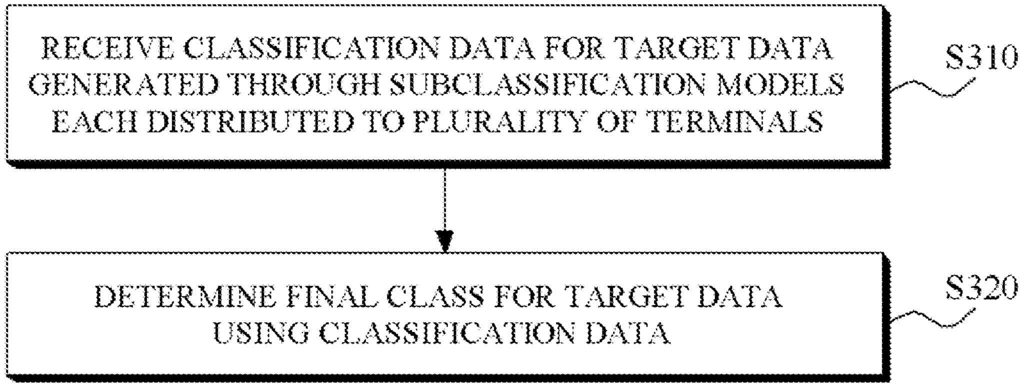
FIG. 3 is a diagram for describing a classification method employing distributed models according to an embodiment of the present disclosure.
Figure 4:
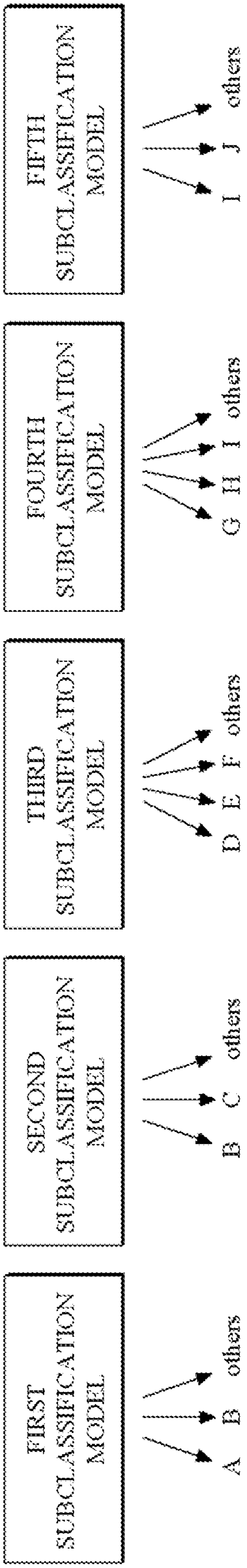
FIGS. 4 and 5 are diagrams for describing subclassification models according to other embodiments of the present disclosure.
Figure 5:
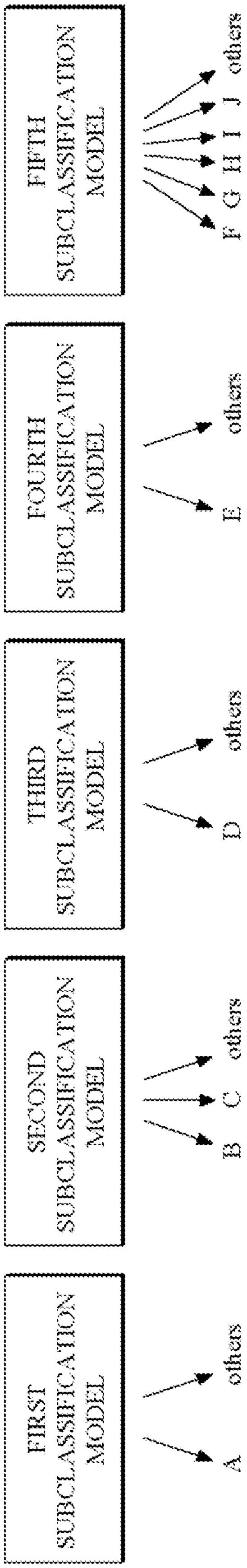

FIG. 3 is a diagram for describing a classification method employing distributed models according to an embodiment of the present disclosure, and FIGS. 4 and 5 are diagrams illustrating subclassification models according to other embodiments of the present disclosure.

A computing device according to the embodiment of the present disclosure receives classification data generated for a target image through a subclassification model distributed to each of a plurality of terminals (S310). The computing device may also generate classification data through a subclassification model allocated thereto.

Classes allocated to subclassification models may include different target classes as shown in FIG. 2, or classes allocated to a first subclassification model and classes allocated to a second subclassification model may include at least one overlapping target class as shown in FIG. 4. Otherwise, different numbers of classes may be allocated to subclassification models.

Meanwhile, classes allocated to a subclassification model may be determined according to an upper concept of target classes. Upper concepts may be determined on the basis of a feature shared among classes and features distinguishing between the classes.

For example, when an example of classes A to J is as shown in [Table 1], the classes may be grouped into upper concept groups as shown in [Table 1]. As shown in FIG. 5, classes allocated to first to fifth subclassification models may respectively include (airplane), (vehicle and truck), (boat), (bird), and (cat, deer, dog, frog, and horse) according to upper concepts.

TABLE 1

| Class | Example of class | Upper concept |
|---|---|---|
| A | Airplane | Transportation using wings |
| B | Vehicle | Transportation using wheels |
| C | Truck | |
| D | Boat | Transportation using water |
| E | Bird | Animals having wings |
| F | Cat | Animals having legs |
| G | Deer | |
| H | Dog | |
| I | Frog | |
| J | Horse | |

Subclassification models classify a target image into one of allocated classes, and classification data generated on the basis of such classification results and transmitted by terminals may include confidence values for classes allocated to the subclassification models.

According to an embodiment, classification data may include confidence values for all the classes allocated to each subclassification model or may include confidence values for target classes excluding the class Others because a final class determined as the class Others does not have significant meaning. For example, when subclassification models shown in FIG. 5 are used, classification data may not include confidence values for the classes Others and may include confidence values for the classes A to J.

Alternatively, classification data may include the largest value among confidence values for classes allocated to a subclassification model. For example, when largest confidence values for the first to fifth subclassification models of FIG. 4 are the classes A, C, D, G, and I, respectively, classification data may include confidence values for the classes A, C, D, G, and I.

The computing device according to the embodiment of the present disclosure determines a final class for the target data using such classification data (S320).

According to an embodiment, the computing device may determine a class corresponding to the largest value among the confidence values as a final class for the target image. For example, when the confidence value for the class A is the largest among the confidence values for the classes A to J, the computing device may determine that the target image is the class A.

Meanwhile, when the same target class is allocated to different subclassification models as shown in FIG. 4, confidence values for the identical target classes of the different subclassification models may be largest values. For example, as classification results of the first and second subclassification models, confidence values for the class B may be the largest. In this case, the computing device may determine, as a final class, a class corresponding to the largest value among the average value of the confidence values of the class B and confidence values of other classes. Alternatively, the computing device may determine, as a final class, a class corresponding to the largest value among a larger one of the two confidence values for the class B and the confidence values of the other classes.

According to another embodiment, the computing device may compare a confidence value with a threshold value and determine a final class. For example, when a confidence value for the class A is the largest among confidence values for the classes A to J and is greater than or equal to the threshold value, the computing device may determine that the class A is a final class. On the other hand, when the confidence value for the class A is smaller than the threshold value, the computing device may determine that the class Others is a final class.

When confidence values for classes allocated to some subclassification models are included in classification data and are smaller than the threshold value, the computing device may determine that a target class not included in the classification data is a final class. For example, when the subclassification models of FIG. 4 are used, the computing device may not receive classification data of the first and second subclassification models, and both confidence values for the classes D and J may be smaller than the threshold value. In this case, the computing device may determine that one of the classes A and C is a final class. When a confidence value for the class D is the largest one among confidence values for the classes D to J, the computing device may determine that the class D is a final class.

Classification data of the first and second classification models may not be received by the computing device due to a communication failure or a failure in terminals to which the first and second subclassification models are allocated. In the classification method according to the embodiment of the present disclosure, distributed classification models are used. Accordingly, even in such a failure situation, it is possible to determine a class for a target image.

The target data for which the final class is determined may be used for training a subclassification model to which the final class is allocated.

Figure 6:
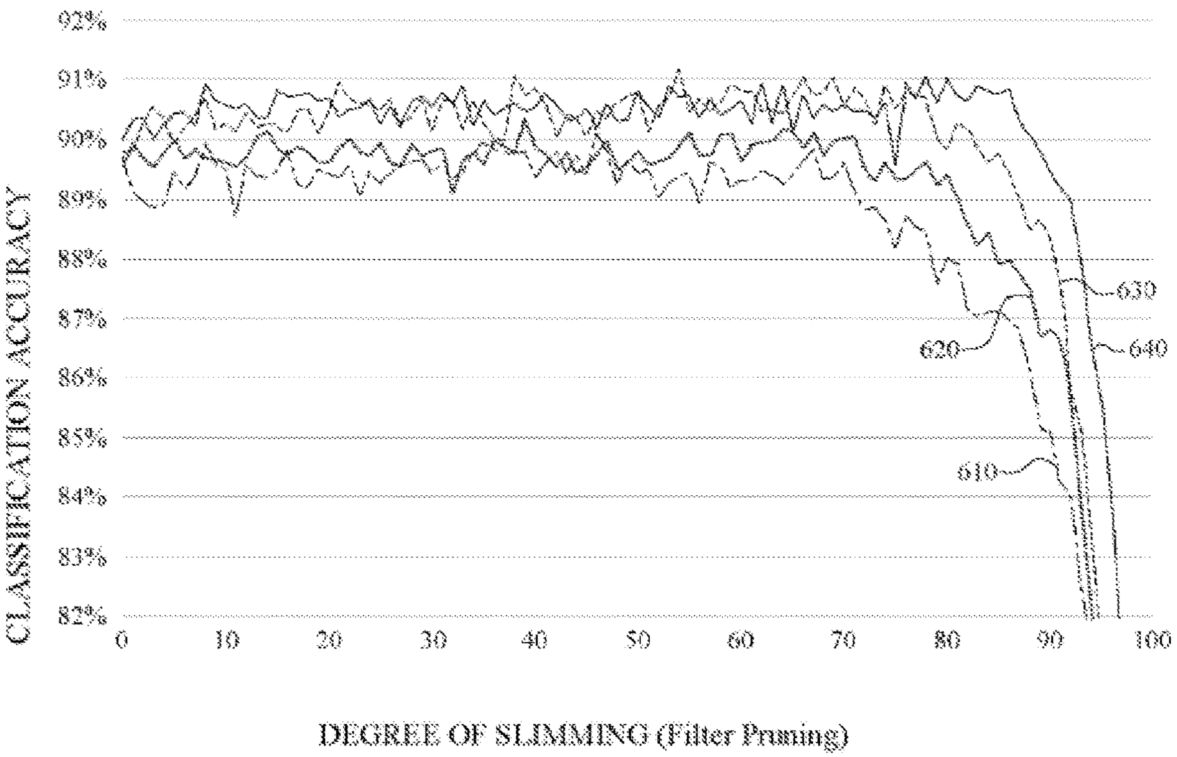
FIG. 6 is a graph illustrating the accuracy of a classification method employing subclassification models according to the embodiment of the present disclosure and a classification method employing a main classification model.

FIG. 6 is a graph describing the accuracy of a classification method employing subclassification models according to the embodiment of the present disclosure and a classification method employing a main classification model.

FIG. 6 shows the classification accuracy of one main classification model 610 to which a plurality of target classes are allocated and two subclassification models 620, five subclassification models 630, and ten subclassification models 640 to which the plurality of target classes are allocated in a distributed manner. The classification accuracy is in accordance with the degree of slimming of the main classification model and the subclassification models.

As shown in FIG. 6, there is no significant difference in accuracy until the degree of slimming reaches 70, but when the degree of slimming exceeds 70, the accuracy of the main classification model is drastically reduced. When a larger number of subclassification models are used, accuracy is maintained even with a higher degree of weight reduction.

Therefore, according to the embodiment of the present disclosure, it is possible to use subclassification models that satisfy required classification accuracy and are more lightened, and thus the amount of computation for classification can be reduced.

Also, according to the embodiment of the present disclosure, even when a failure occurs in a terminal to which some subclassification models are allocated, it is possible to perform classification using classification data of the remaining subclassification models as described above. Accordingly, stable classification results can be acquired.

Figure 7:
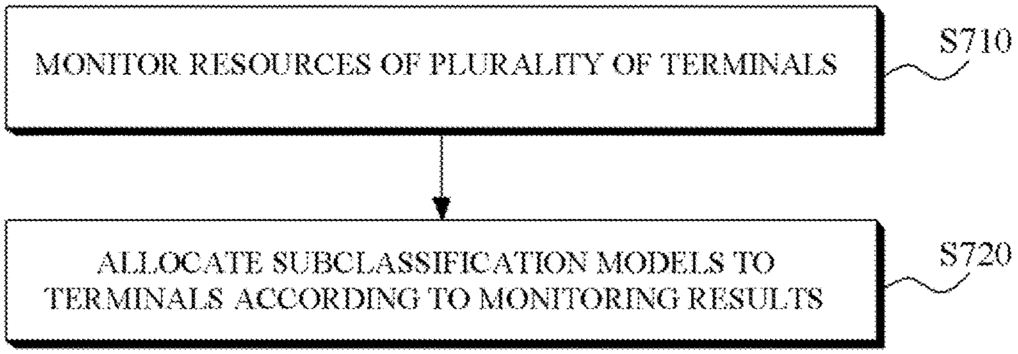
FIG. 7 is a diagram for describing a classification method employing distributed classification models according to another embodiment of the present disclosure.

FIG. 7 is a diagram for describing a classification method employing distributed classification models according to another embodiment of the present disclosure.

Referring to FIG. 7, a computing device according to the embodiment of the present disclosure may monitor resources of a plurality of terminals (S710) and allocate subclassification models to the terminals according to the monitoring results (S720).

According to an embodiment, the computing device may allocate subclassification models to the terminals according to available resources of the terminals, and the number of classes allocated to be each subclassification model may be determined according to available resources of the terminals. A subclassification model allocated to a terminal having a large amount of available resources may have a larger number of classes allocated thereto than a subclassification model allocated to a terminal having a small amount of available resources.

For example, when the subclassification models of FIG. 5 are used and the first terminal has the largest amount of available resources, the fifth subclassification model may be allocated to the first terminal. Also, when the second terminal has the smallest amount of available resources, one of the first, third, and fourth subclassification models may be allocated to the second terminal.

Figure 8:
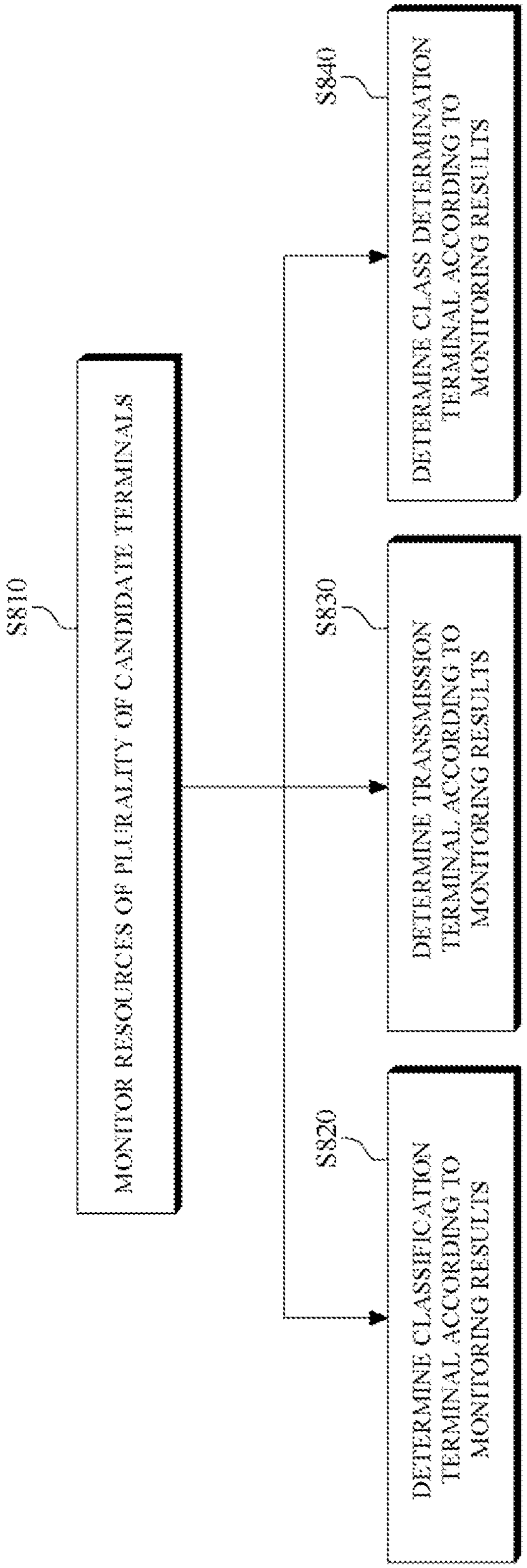
FIG. 8 is a diagram for describing a classification method employing distributed classification models according to another embodiment of the present disclosure.

FIG. 8 is a diagram for describing a classification method employing distributed classification models according to another embodiment of the present disclosure.

Referring to FIG. 8, a computing device according to the embodiment of the present disclosure may monitor resources of a plurality of candidate terminals (S810) and determine a classification terminal for classifying target data using a subclassification model among the candidate terminals according to the monitoring results (S820).

In the operation S820, the computing device may determine a classification terminal according to available resources of the terminals and determine classification terminals in decreasing order of available resources.

Meanwhile, when target data is transmitted through a terminal, the computing device according to the embodiment of the present disclosure may determine a transmission terminal for transmitting the target data to the classification terminals among the candidate terminals according to the monitoring results (S830). One of the candidate terminals having a large amount of available resources may be determined as the transmission terminal. For example, one of the classification terminals may be determined as the transmission terminal, or a terminal that does not classify the target data may be determined as the transmission terminal.

When a final class for the target data is determined through a terminal, the computing device according to the embodiment of the present disclosure may determine a class determination terminal for determining a final class for the target data among the candidate terminals according to the monitoring results (S840). The class determination terminal may receive classification data generated for the target data through subclassification models each distributed to the classification terminals and determine the final class, and one of the candidate terminals having a large amount of available resources may be determined as the class determination terminal.

The operations S820, S830, and S840 may be performed in parallel and selectively on the basis of the monitoring results.

The above-described technical content may be implemented in the form of a program command executable by various computing means and recorded on a computer-readable recording medium. The computer-readable recording medium may include program commands, data files, data structures, etc. individually or in combination. The program commands recorded on the medium may be specially designed or configured for embodiments or may be known to and available for those of ordinary skill in the computer software field. Examples of the computer-readable recording medium include magnetic media such as a hard disk, a floppy disk, and magnetic tape, optical media such as a compact disc read-only memory (CD-ROM) and a digital versatile disc (DVD), magneto-optical media such as a floptical disk, and hardware devices such as a ROM, a random access memory (RAM), and a flash memory for storing and executing program commands. Examples of the program commands include a machine language code created by a compiler and a high-level language code executable by a computer through an interpreter and the like. The hardware devices may be configured to operate as at least one software module to perform operations of the embodiments, and vice versa.

While the present disclosure has been described above with reference to specific details, such as specific elements, and limited embodiments and drawings, these are only provided to aid in overall understanding of the present disclosure and can be diversely modified and altered by those of ordinary skill in the art should appreciate. Therefore, the scope of the present disclosure should not be limited to the above-described embodiments, and in addition to the following claims, all of equivalents thereto and equivalent modifications fall within the scope of the present disclosure.

The invention claimed is:

1. A computer-implemented classification method for enhancing classification accuracy of target data across network computing terminals by processing computation of a classification model in a distributed manner by splitting the computation to a plurality of terminals, the classification method comprising:

monitoring, performed by one of the plurality of terminals or a server, terminal resources of the plurality of terminals, wherein the terminal resources include an amount of computation, a memory size and a network usage of the plurality of terminals;

allocating subclassification models to each of the plurality of terminals according to monitoring results of the terminal resources of the plurality of terminals, wherein the allocating comprises selecting, for each terminal, a subset of classes whose execution satisfies a resource threshold associated with that terminal, and wherein the subclassification models are artificial neural networks, generate confidence values for classes allocated to the subclassification models as classification data for the target data;

receiving, performed by at least one of the plurality of terminals or the server, the classification data for the target data generated through the subclassification models each distributed to the plurality of terminals; and determining, performed by one of the plurality of terminals or the server, a final class for the target data using the received classification data even when classification data from at least one of the subclassification models is not received due to a communication failure or terminal failure, wherein the classes allocated for classification to each of the subclassification models, which have been trained in advance, include a subset of a plurality of target classes allocated to a main classification model, and wherein the number of classes allocated to each of the subclassification models is less than the number of target classes allocated to the main classification model—wherein the classes allocated for classification to each of the subclassification models and target classes are in the same hierarchy, and wherein a distributed execution of the subclassification models is based on the monitored terminal resources of the plurality of terminals and enables classification of the target data that exceeds the resources available at any individual terminal of the plurality of terminals.

2. The classification method of claim 1, wherein the classes allocated to each of the subclassification models further include other class that is a class other than the target classes.

3. The classification method of claim 1, wherein the subclassification models are lightweight models from the main classification model, and the classes allocated for classification to the main classification model include the plurality of target classes.

4. The classification method of claim 1, wherein the classes allocated to each of the subclassification models include different target classes.

5. The classification method of claim 1, wherein the classes allocated to each of the subclassification models are determined according to an upper concept of the target classes.

6. The classification method of claim 1, wherein classes allocated to first and second subclassification models among the subclassification models include at least one overlapping target class.

7. The classification method of claim 6, wherein the classification data includes confidence values for the classes allocated to each of the subclassification models, and the determining of the final class comprises determining the final class using a largest one of the confidence values of the overlapping target class or an average value of the confidence values of the overlapping target class.

8. The classification method of claim 2, wherein the classification data includes confidence values for the classes allocated to each of the subclassification models, and the determining of the final class comprises determining a class corresponding to a largest one of the confidence values as the final class.

9. The classification method of claim 8, wherein the classification data includes confidence values for the target classes among the classes allocated to each of the subclassification models.

10. The classification method of claim 2, wherein the classification data includes a largest one of confidence values for the classes allocated to each of the subclassification models, and the determining of the final class comprises determining the final class using the largest value.

11. The classification method of claim 10, wherein the classification data includes confidence values for the target classes among the classes allocated to each of the subclassification models.

12. The classification method of claim 1, wherein the classification data includes confidence values for classes allocated to some of the subclassification models, and the determining of the final class comprises determining a target class not included in the classification data as the final class when the confidence values are smaller than a threshold value.

13. A computer-implemented classification method for enhancing classification accuracy of a target image across network computing terminals by processing computation of a classification model in a distributed manner by splitting the computation to a plurality of terminals, the classification method comprising:

monitoring, by one of the plurality of terminals or a server, resources of the plurality of terminals, wherein the resources of the plurality of terminals include an amount of computation, a memory size and a network usage;

allocating subclassification models to the plurality of terminals according to a monitoring result, wherein the allocating comprises selecting, for each terminal, a subset of classes whose execution satisfies a resource threshold associated with that terminal, and wherein the subclassification models are artificial neural networks and the allocation of the subclassification models to the plurality of terminals is dynamically updated in response to changes in the monitored resources;

generating, by the subclassification models, classification data for the target image, wherein the classification data includes confidence values for classes allocated to the subclassification models receiving, by at least one of the plurality of terminals or the server, the classification data for the target image generated through the sub-classification models each distributed to the plurality of terminals; and determining, by one of the plurality of terminals or the server, a final class for the target image using the received classification data even when classification data from at least one of the subclassification models is not received due to a communication failure or terminal failure, wherein the classes allocated for classification to each of the subclassification models, which have been trained in advance, include a subset of a plurality of target classes allocated to a main classification model, and wherein the number of classes allocated to each of the subclassification models is less than the number of target classes allocated to the main classification model, wherein the classes allocated for classification to each of the subclassification models and target classes are in the same hierarchy, and wherein a distributed execution of the subclassification models is based on the monitored terminal resources of the plurality of terminals and enables classification of the target image that exceeds the resources available at any individual terminal of the plurality of terminals.

14. The classification method of claim 13, wherein the number of classes allocated to each of the subclassification models is determined according to available resources of the plurality of terminals, and the classes allocated to each of the subclassification models further include other class that is a class other than the target classes.

* * * * *